United States Patent [19]
Gray, Jr. et al.

[11] Patent Number: 5,617,823
[45] Date of Patent: Apr. 8, 1997

[54] SPARK-IGNITED RECIPROCATING PISTON ENGINE HAVING A SUBDIVIDED COMBUSTION CHAMBER

[76] Inventors: Charles Gray, Jr., 4323 Cordley Lake Rd., Pinckney, Mich. 48169; Karl H. Hellmann, 2690 Overridge, Ann Arbor, Mich. 48104; Gary W. Rogers, 610 Linden Rd., Birmingham, Mich. 48009; Ulrich Hilger, Virchowstrasse 20, D-45147 Essen, Germany

[21] Appl. No.: 617,422

[22] Filed: Mar. 18, 1996

Related U.S. Application Data

[63] Continuation of Ser. No. 432,423, Apr. 27, 1995, abandoned.

[30] Foreign Application Priority Data

Apr. 29, 1994 [DE] Germany .................. 44 15 073.3

[51] Int. Cl.⁶ .................................................. F02P 1/00
[52] U.S. Cl. .................................................. 123/254
[58] Field of Search ........................... 123/254, 219, 123/261, 265, 269, 281, 283

[56] References Cited

U.S. PATENT DOCUMENTS

| | | | |
|---|---|---|---|
| 1,696,799 | 12/1926 | Held | 123/279 |
| 2,505,999 | 5/1950 | Smith | 123/279 |
| 3,315,650 | 4/1967 | Bishop et al. | 123/279 |
| 3,797,466 | 3/1974 | Nambu | 123/279 |
| 4,738,227 | 4/1988 | Kamo et al. | 123/254 |
| 5,012,777 | 5/1991 | Baker et al. | 123/254 |
| 5,322,042 | 6/1994 | Di Priolo et al. | 123/279 |
| 5,329,901 | 7/1994 | Onishi | 123/254 |
| 5,483,933 | 1/1996 | Kawamura | 123/254 |

*Primary Examiner*—Raymond A. Nelli
*Attorney, Agent, or Firm*—Spencer & Frank

[57] ABSTRACT

An internal-combustion engine includes a cylinder having an upper, generally planar bounding surface formed by an inner wall portion of a cylinder head; a fuel injection device and a spark plug held in the cylinder head and opening into the cylinder; a piston axially slidably disposed in the cylinder; a combustion chamber defined between the upper bounding surface of the cylinder head and the top piston face when the piston is in its upper dead center position; and an annular ridge situated on the top piston face. The annular ridge subdivides the combustion chamber into an inner partial combustion chamber and an outer partial combustion chamber surrounding the inner partial combustion chamber. The inner partial combustion chamber is situated in an effective range of the fuel injection device and the spark plug. Further, throughgoing apertures are provided in the annular ridge for maintaining a continuous communication between the inner and outer partial combustion chambers.

16 Claims, 2 Drawing Sheets

SPARK-IGNITED RECIPROCATING PISTON ENGINE HAVING A SUBDIVIDED COMBUSTION CHAMBER

This application is a continuation of application Ser. No. 08/432,423, filed Apr. 27, 1995, now abandoned.

CROSS REFERENCE TO RELATED APPLICATION

This application claims the priority of German Application No. P 44 15 073.3 filed Apr. 29, 1994, which is incorporated herein by reference.

BACKGROUND OF THE INVENTION

The use of alcohol fuels, particularly methanol, because they are well adapted for the combustion process in internal combustion engines, has been developed long ago in the field of internal combustion engines operating on compressed fuel mixture. More recently, alcohol engines have reached a new stature because of their satisfactory environmental behavior. Alcohol engines emit—with the exception of aldehydes—less pollutants than comparable gasoline engines. The composition of the emitted hydrocarbons has, in addition, a lesser photochemical reactivity with respect to ozone production and thus leads to a lesser ozone damage.

In alcohol engine designs where fuel injection is effected through a suction intake pipe, it has been found that because of the unsatisfactory cold engine start when pure alcohol was used as fuel, only a mixture of 85–90% methanol or ethanol and a corresponding proportion of low-boiling point hydrocarbons made possible a disturbance-free operation. Tests with alcohol engines fueled with methanol have shown, however, that even if a special three-way catalyst system is used, it has to be regarded as extremely critical that—while taking into consideration the required test distance of 50,000 miles—the limit values determined by the California anti-pollution laws (LEV and ULEV) for the formaldehyde emission in the methanol operation are not exceeded. The basic reason for such relatively high raw formaldehyde emissions in methanol driven Otto-cycle engines is the "quench effect" unavoidably appearing at the relatively cool walls of the combustion chamber and the cylinder upon external mixture formation and the incomplete combustion of the fuel/air mixture caused by such "quench effect". These disadvantages are encountered particularly during low-load engine run.

To avoid emission and cold start problems encountered typically in alcohol engines in which fuel is injected into the suction pipe, the so-called stratified-charge engines have been developed in which the fuel is injected directly into the combustion chamber and the combustion is initiated by means of an ignition device constituted by a spark plug or a glow plug. In these arrangements the injection of the alcohol fuel is effected preferably shortly before the piston reaches its upper dead center, so that an intensive contact of the fuel or the already formed mixture with the cooler combustion chamber parts is limited to a relatively small surface of the combustion chamber. This effect is enhanced particularly in case of high-compression engines with high cylinder charging temperatures at the moment of the injection by a rapid vaporization of the injected alcohol fuel. Nevertheless, the mixture layers which depend from the geometry of the injected jet in the combustion chamber, cause significant problems, involved particularly with the use of spark plugs. Spark plugs, however, have a significant advantage over permanently heated glow plugs because the ignition start may be controlled independently from the beginning of the injection. The jet expansion dependent upon the injected fuel quantities leads—apart from the stochastic oscillations of the jet geometry typical for each injected jet—to significantly varying mixture compositions in the region of the spark plug, involving significantly fluctuating ignition quality, including ignition misses. Since, in addition, a direct impingement of a still liquid fuel on the spark plug has to be avoided, a coordination of the position of the injection jet in the combustion chamber and in relationship to the spark plug has to be so selected that in case of large injected fuel quantities, excessive fuel quantity should not reach the spark plug. On the other hand, in case of lesser injection quantities, for example, during idling, no ignition misses should occur. These are caused by an excessively lean mixture at the spark plug electrodes. The coordination compromises in regard to an acceptable overall operational behavior lead in general to increased emissions of non-combusted or only partially combusted fuel in the partial load range. The full-load behavior is essentially characterized by a significant excess of air required for a complete combustion of the non-homogenous mixture and accordingly, by a small specific output as compared to an Otto-cycle engine. Because of the basically lean operational mode, in such engines, paritcularly at higher engine loads, significantly higher $NO_x$ emissions are to be expected than in Otto-cycle engines with a stoichiometrical mixture and corresponding three-way catalyst control.

SUMMARY OF THE INVENTION

It is an object of the invention to provide an improved reciprocating piston engine which is adapted for use with knock-free fuels, particularly methanol and ethanol alcohols and thereby avoids the disadvantages of conventional engine designs.

This object and others to become apparent as the specification progresses, are accomplished by the invention, according to which, briefly stated, the internal-combustion engine includes a cylinder having an upper, generally planar bounding surface formed by an inner wall portion of a cylinder head; a fuel injection device and a spark plug held in the cylinder head and opening into the cylinder; a piston axially slidably disposed in the cylinder; a combustion chamber defined between the upper bounding surface of the cylinder head and the top piston face when the piston is in its upper dead center position; and an annular ridge situated on the top piston face. The annular ridge subdivides the combustion chamber into an inner partial combustion chamber and an outer partial combustion chamber surrounding the inner partial combustion chamber. The inner partial combustion chamber is situated in an effective range of the fuel injection device and the spark plug. Further, throughgoing apertures are provided in the annular ridge for maintaining a continuous communication between the inner and outer partial combustion chambers.

It is an advantage of the engine according to the invention that in the low-load range the non-homogenous mixture introduced into the combustion chamber is securely ignited and burns in a highly pollutant-free manner, while in the high-load range a substantially homogenous mixture with stoichiometric composition is combusted. In the upper dead center position of the piston, the inner partial combustion chamber is, apart from the throughgoing ridge apertures, separated from the outer partial combustion chamber by the annular ridge, whose outer free top edge is situated immediately at the inner, cylinder-defining wall of the cylinder head. If in the partial-load range a relatively small injection quantity is introduced into the inner partial combustion chamber, this fuel quantity remains in the inner partial combustion chamber even during the formation of mixture and the first ignition phase and thus cannot gain access to the cooler walls of the combustion chamber. Upon an increase of the engine load with correspondingly greater injection quantities, the combustible mixture arrives, even during the injection, but particularly immediately after ignition, from the inner partial combustion chamber into the outer partial combustion chamber and may be completely combusted therein. In the operation of such an engine running on methanol, the formaldehyde emissions are small due to the high combustion temperature level. The inner combustion chamber surrounded by the annular ridge is arranged on the piston in such a manner that it is approximately symmetrical relative to an imaginary connecting line between the injection nozzle and the spark plug.

It is to be noted that the concept "annular ridge" is not limited to the configuration of a circular ring but includes other shapes of the outer or inner contour of the ridge defining the partial combustion chambers. Thus, an oval, elliptical or even polygonal contour is feasible to accommodate an advantageous arrangement of the injection nozzle and the spark plug to achieve an optimal mixture formation. The configuration of the inner contour may be different from that of the outer contour, in which case the radial ridge thicknesses will be different.

It is further to be noted that the "throughgoing apertures" provided in the annular ridge designate not only groove-like recesses which interrupt the ridge contour including its upper edge, but also bores which pass through the ridge wall while, at the same time, the free upper ridge edge remains continuous. Thus, according to the invention, the ridge apertures have a passage axis which may be either radial or may be oriented at an angle to the associated diameter. In the latter case, in a valve-controlled reciprocating piston engine having a valve arrangement which provides for a twisted course of the air drawn into the cylinder chamber, such twisting effect is enhanced for the fuel mixture as it passes from the inner partial combustion chamber into the outer partial combustion chamber.

According to an advantageous feature of the invention, the outer partial combustion chamber is surrounded by an outer ridge provided at or adjacent the outer upper periphery of the piston. Particularly in case of larger injection quantities, such a feature prevents incompletely vaporized fuel quantities from impinging directly on the cooler cylinder wall as the fuel progresses radially outwardly. Rather, the fuel is compelled to contact the significantly hotter outer ridge of the piston and vaporize completely at that location.

According to a further feature of the invention, the upper free edges of at least the annular ridge are rounded. This avoids temperature peaks which would adversely affect particularly the piston material.

According to a further feature of the invention, the bottom of the outer partial combustion chamber is at a different height level relative to the bottom of the inner partial combustion chamber. By virtue of this feature, an optimization of the course of mixture formation, ignition and combustion is feasible. Dependent upon the engine design, the bottom of the outer partial combustion chamber may be at a lower or a higher level than the bottom of the inner combustion chamber. In this manner, the desired optimization is possible particularly in reciprocating piston engines which, according to a further feature of the invention, are so operated that in the partial-load range fuel is injected exclusively and directly into the combustion chamber, while in the full-load range fuel is injected additionally into the suction intake pipe. In such an arrangement it is expedient to so design the engine that the volume of the inner partial combustion chamber is between 5 and 40% of the entire combustion chamber volume. It is noted that the combustion chamber volume is defined by the free space between the cylinder head and the upper piston face when the piston is in its upper dead center position.

According to a further feature of the invention, at least the region of the inner partial combustion chamber is heat-insulated from the remainder of the piston body. As a result of such an arrangement, the cooling of the piston body necessarily occurring during the intake and exhaust phases is reduced so that at least the inner partial combustion chamber in which the fuel is directly injected, maintains a high temperature level and thus effects an at least approximately complete vaporization. Such a heat insulation may be effected either by an insert sunk into a well-like depression in the piston crown and made of a material having a lesser heat conductivity than the piston material and/or the structural configuration is so designed that only a relatively small heat conduction to the remaining parts of the piston is ensured. The insulating effect may also be achieved by means of a ceramic coating provided on the upper face of at least the inner partial combustion chamber.

The reciprocating piston engine outlined above may be designed as a 2-stroke or as a 4-stroke engine and may use not only pure alcohol fuels and fuels having a preponderantly alcohol proportion but also conventional mineral oil fuels (such as gasoline).

According to a further embodiment of the invention, which is particularly adapted for use in alcohol engines provided with spark-plug ignition and a fuel injection device which directly injects fuel into the cylinder chamber, the fuel injection device includes a controllable injection valve. As a function of the load condition of the engine and by adapting the injection period and the starting moment of the injection, in the partial-load conditions the mixture formation may be limited to a partial region of the combustion chamber, preferably to the inner partial combustion chamber defined by an annular ridge, provided with throughgoing apertures. Due to such an arrangement, fuel injection may be effected in the low-load range at a moment shortly before the piston reaches its upper dead center and the annular ridge substantially separates the inner partial combustion chamber from the outer partial combustion chamber. The fuel is, in the inner partial combustion chamber, applied to the wall and vaporized. By virtue of the vaporization as well as by the charge motion caused by the piston motion, a layered mixture is formed which is ignitable by the spark plug and it is thus ensured that in a relatively small injection quantity range an intensive ignition of the fuel/air mixture is achieved. During the mixture formation and ignition phase the introduced fuel remains in the inner partial combustion chamber and thus cannot gain access to the cooler combustion chamber walls. Upon an increase of the engine load with a corresponding increase of the injection quantities, the predetermined delayed injection start is first maintained until an approximately stoichiometrical air ratio exists in the inner partial combustion chamber. Upon further increase of the engine load by a corresponding adjustment for an earlier injection start, such an early fuel injection takes place that, even before the piston reaches its upper dead center, a homogenous, for example, a stoichiometrical alcohol/air mixture has been formed in the entire combustion chamber. The moment of ignition is so selected that the entire mixture is combusted in the shortest possible time. Particularly in the upper dead center position of the piston, the throughgoing ridge apertures which connect the inner partial combustion chamber with the outer partial combustion chamber ensure that also in case of a relatively late moment of ignition the mixture ignited in the inner partial combustion chamber reaches and ignites, in a torch-like manner, the remainder of the mixture situated in the outer partial combustion chamber.

According to a further advantageous feature of the invention, an additional injection device is arranged in the air intake suction pipe of the cylinder and upon exceeding a predetermined engine load, additional fuel may be mixed to the intake air by means of a controllable injection valve forming part of the additional injection device. By virtue of this measure, the advantages of a stratified-charge engine with direct fuel injection in the partial-load range may be combined for the high-load operation with the advantages of a mixture-aspirating engine which may include a throttle control. Such an arrangement results in a purposeful optimization of the partial-load operation and the full-load operation leading, for both operational ranges, to a substantially complete combustion of the injected fuel and thus to an only very slight pollutant emission at a high specific output.

DESCRIPTION OF THE PREFERRED EMBODIMENTS

Figure 1:
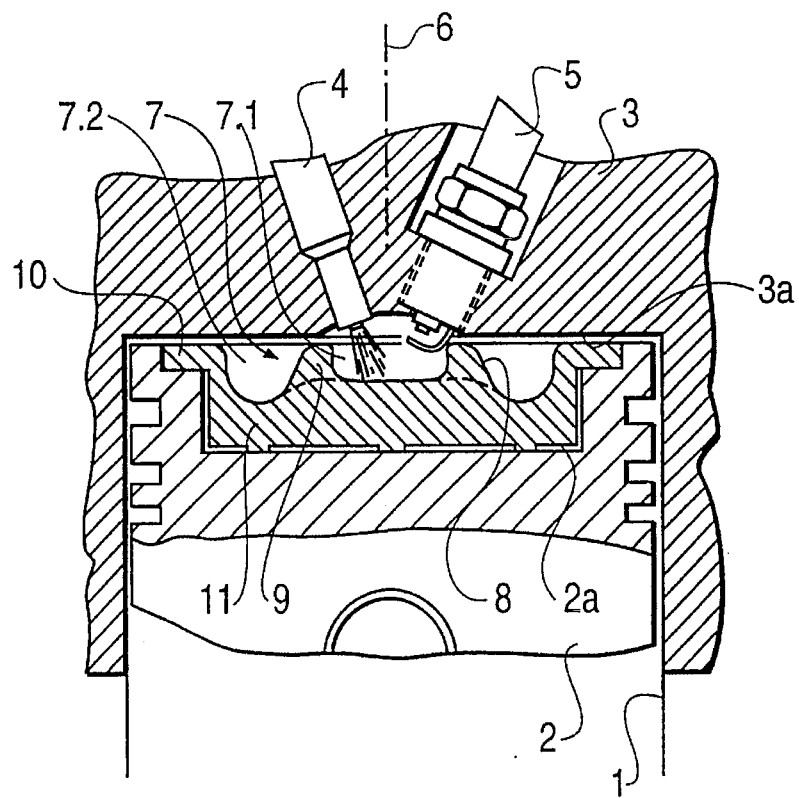
FIG. 1 is a fragmentary axial sectional view of a piston/cylinder assembly illustrating a preferred embodiment of the invention and showing the piston in its upper dead center position.

Turning to FIG. 1, there is illustrated therein an engine cylinder 1 and a piston 2 disposed in the cylinder 1 and shown in its upper dead center position. The upper part of the cylinder 1 is formed in a cylinder head 3 which supports a fuel injection device 4 and a spark plug 5 which, in the illustrated embodiment, are situated close to and on opposite sides of, the cylinder axis 6 and are inclined relative thereto. The inner surface 3a of the cylinder head 3 which constitutes the upper end of the cylinder 1 is substantially planar and has only a slight concave portion in the inlet zone of the injection device 4 and the spark plug 5. The intake and exhaust valves are not shown for the sake of simplicity.

Figure 2:
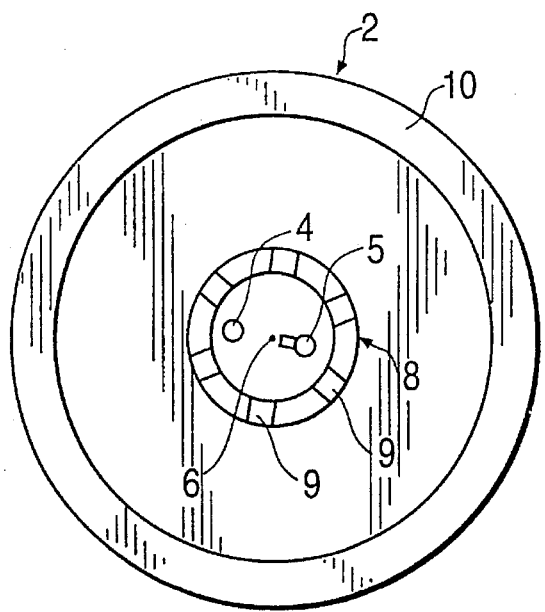
FIG. 2 is a top plan view of the piston shown in FIG. 1.

A combustion chamber 7 is defined by the upper face of the piston 1 in its upper dead center position and the inner surface 3a of the cylinder head 3 which closes off the cylinder 1. On the upper side of the piston an annular ridge 8 is arranged which subdivides the combustion chamber 7 into an inner partial combustion chamber 7.1 and an outer partial combustion chamber 7.2. The inner partial combustion chamber 7.1 is in the effective range of the injection device 4 and the spark plug 5. The annular ridge 8 is provided with a plurality of throughgoing apertures which are constituted by upwardly open radial grooves 9 provided in the ridge 8 and through which the two partial combustion chambers 7.1 and 7.2 are in communication with one another even if the piston 2, as shown in FIG. 2, is situated in its upper dead center position. The outer partial combustion chamber 7.2 is surrounded by an outer ridge 10 arranged close to and along the outer upper periphery of the piston 2.

In the embodiment illustrated in FIG. 1 the partial combustion chambers 7.1 and 7.2 are, together with the annular ridge 8 as well as the outer ridge 10, formed in an insert 11 made of a material whose heat conductivity is less than that of the piston material so that during the intake and exhaust phase the combustion chamber zone which arrives into direct contact with the fuel during the injection phase maintains a possibly high temperature level. The insert 11 is accommodated in a well 2a provided in the crown (top face) of the piston 2.

It is, however, feasible to provide the partial combustion chambers 7.1 and 7.2 directly in the piston body. In such a case, it is advisable to provide the upper surface of the piston, at least in the region of the partial combustion chambers, with a ceramic coating which may be applied, for example, by a plasma spraying process.

As shown in FIG. 2, the annular ridge 8 is oriented concentrically to the cylinder and piston axis 6 so that the partial combustion chamber 7.1 is circular and the partial combustion chamber 7.2 is circularly annular. In an alternative geometric arrangement of the injection device 4 and the spark plug 5 with respect to the cylinder axis 6 the inner partial combustion chamber 7.1 is, correspondingly to the arrangement of the injection device 4, shifted towards the spark plug 5. The annular ridge 8, in case of such a shift relative to the cylinder axis 6, may have a shape that differs from a purely circular configuration and which may be coordinated with the flow behavior in the combustion chamber, particularly with the course of the flame boundary upon transition from the inner partial combustion chamber to the outer partial combustion chamber.

Figure 2A:
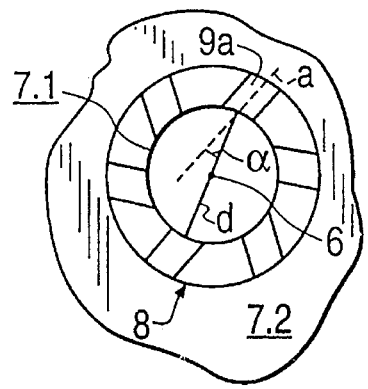
FIG. 2a is a top plan view of one part of the piston, illustrating a variant.

The throughgoing ridge apertures 9, by means of which the inner partial combustion chamber 7.1 continuously communicates with the outer partial combustion chamber 7.2 are, in the embodiment illustrated in FIG. 2, centrally symmetrically arranged relative to the injection device 4 and the spark plug 5 (FIG. 1) and are of star-like, radial orientation in order to ensure a uniform passage of the flame front from the inner partial combustion chamber 7.1 into outer partial combustion chamber 7.2 and to thus effect a uniform progression of combustion in the outer partial combustion chamber 7.2 as well. In the variant shown in FIG. 2a, the throughgoing apertures 9a provided in the annular ridge 8 are not radial; rather, the passage axis a of each aperture 9a is oriented at an inclination α to a diametral line d traversing the ridge 8 and extending to the axis a of the respective aperture 9a.

Figure 3:
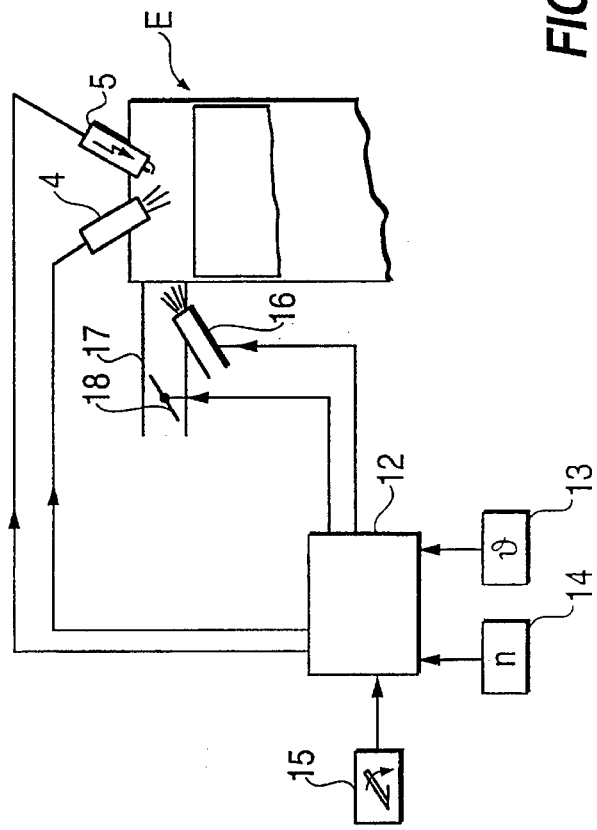
FIG. 3 is a block diagram of a fuel injection system for controlling the engine operation according to the invention.

FIG. 3 shows a block diagram of an engine control (fuel injection control system) for a cylinder in a reciprocating piston engine, having a combustion chamber configuration according to the invention as described above. The control arrangement essentially consists of an engine control device 12 in which as essential operational data the engine temperature and the engine rpm are inputted through the inputs 13 and 14, respectively. By means of a transmitter 15 coupled to the gas pedal, the desired load is applied to the device 12 by the driver as a further setting signal.

In the example illustrated in FIG. 3, the engine E is provided with an injection device 4 for directly injecting fuel into the combustion chamber as well as a spark plug 5 as described in connection with FIG. 1. Accordingly, a setting signal from the engine control device is applied to the injection valve of the injection device 4. In this manner it is possible to control the duration of injection and thus the injection quantities as a function of the load signals applied by the transmitter 15. The moment of ignition may be similarly controlled.

In addition to the injection device 4, the engine E has a further injection device 16 which opens into the air intake pipe 17 of the piston/cylinder unit of the engine E and which may be controlled by the engine control device 12 as well. In the air intake pipe 17 a controllable butterfly valve 18 is disposed, whose position may also be adjusted by the engine control device 12 within a predetermined range.

Figure 4:
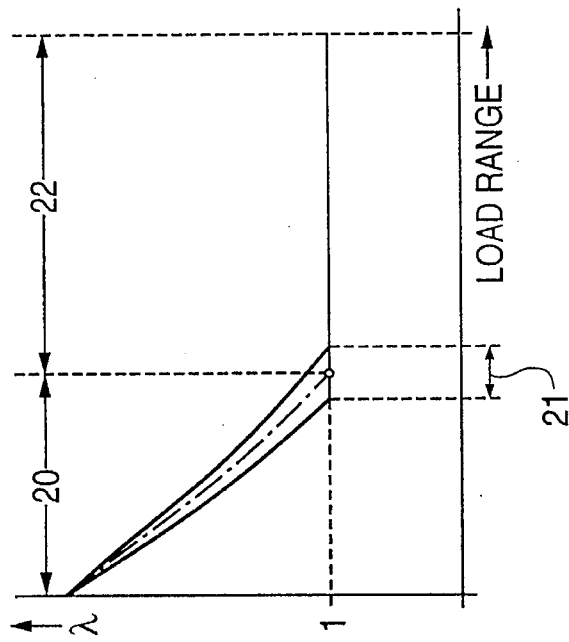
FIG. 4 is a diagram illustrating the combustion air λ in the combustion chamber as a function of the engine load.

With the aid of the above-described engine control, an engine structured as described in connection with FIG. 1 is capable of operating over the entire load range with minimum pollutant emission even if fueled with alcohol. In FIG. 4 the combustion air ratio number $\lambda$ is shown as a function of the load range of the respective engine. The partial-load range in which the engine is operated without throttle in the lean mode, that is, with a combustion air ratio number $\lambda=1$ is characterized by the zone 20. The engine control is so designed that with increasing zone, $\lambda$ approaches the value 1 until this value is reached in a transition zone 21. Upon increasing the engine load, the injection start and the injection duration are so regulated that over the high-load range 22 the stoichiometrical operation, that is, a combustion air ratio number $\lambda=1$ may be maintained until the full-load limit is reached.

Figure 5:
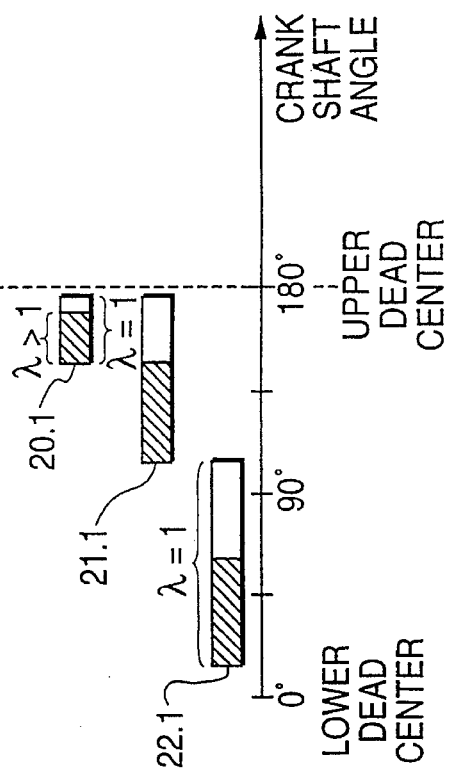
FIG. 5 is a diagram illustrating various injection times and durations for various load conditions as a function of the crankshaft angle.

The above-described injection strategy is further explained in conjunction with FIG. 5. In the diagram shown therein the beginning of injection and its duration as a function of load relative to the crank angle between the lower dead center (0° crank angle) and the upper dead center (180° crank angle) are shown as bars. In this illustration the bar 20.1 corresponds to the partial-load range 20 shown in FIG. 4, bar 21.1 corresponds to the transition zone 21 and the bar 22.1 corresponds to the high-load range 22. The transition range 21 for the transition from the lean operation to the "$\lambda=1$-operation" is thus dependent, for example, from the engine rpm. By means of the geometric configuration of the inner partial combustion chamber 7.1 as described in connection with FIGS. 1 and 2, in case of corresponding coordination of the engine control and the injection device it is possible to design the transition zone in such a manner that a highly satisfactory operational behavior is obtained. During the operation in the partial-load range 20 the engine control device 12 operates exclusively the injection device 4, so that the fuel is injected exclusively into the inner partial combustion chamber 7.1 and is ignited there. In the transitional zone 21 or in the high-load range 22 the injection start is advanced and the duration of injection is prolonged as shown in FIG. 5. Additionally or as an alternative to the very substantially "early" setting of the injection moment in high-load requirements (high-load zone), fuel may be injected also into the air suction channel 17 by means of the injection device 16 so that by the time ignition takes place, the entire combustion chamber 7 is homogeneously and uniformly filled with the fuel/air mixture.

It will be understood that the above description of the present invention is susceptible to various modifications, changes and adaptations, and the same are intended to be comprehended within the meaning and range of equivalents of the appended claims.

What is claimed is:

1. An internal-combustion engine comprising
   (a) a cylinder head;
   (b) means, including said cylinder head, for defining a cylinder having a cylinder axis and an upper bounding surface formed by an inner wall portion of said cylinder head;
   (c) a fuel injection device held in said cylinder head and opening into said cylinder;
   (d) a spark plug held in said cylinder head and opening into said cylinder;
   (e) a piston axially slidably disposed in said cylinder for reciprocating motions between lower and upper dead center positions; said piston having a top piston face oriented towards said upper bounding surface;
   (f) a combustion chamber defined between said upper bounding surface and said top piston face when said piston is in said upper dead center position;
   (g) an annular ridge situated on said top piston face; said annular ridge subdividing said combustion chamber into an inner partial combustion chamber and an outer partial combustion chamber surrounding said inner partial combustion chamber; said inner partial combustion chamber being situated is an effective proximity of said fuel injection device and said spark plug; and
   (h) throughgoing apertures provided in said annular ridge for maintaining a continuous communication between said inner and outer partial combustion chambers.

2. The internal-combustion engine as defined in claim 1, wherein said apertures extend radially through said annular ridge relative to said cylinder axis.

3. The internal-combustion engine as defined in claim 1, wherein said apertures pass through said annular ridge at an inclination relative to a diametral line extending from said cylinder axis to respective said apertures.

4. The internal-combustion engine as defined in claim 1, further comprising an additional ridge provided on said piston and surrounding said outer partial combustion chamber.

5. The internal-combustion engine as defined in claim 1, wherein said annular ridge has a rounded outer edge.

6. The internal-combustion engine as defined in claim 1, wherein said inner and outer partial combustion chambers each have a bottom; further wherein the bottom of said outer partial combustion chamber is disposed at a height level different from a height level of the bottom of said inner partial combustion chamber.

7. The internal-combustion engine as defined in claim 1, wherein the volume of said inner partial combustion chamber is between 15 and 30% of the total volume of said combustion chamber.

8. The internal-combustion engine as defined in claim 1, further comprising heat-insulating means for heat-insulating said inner partial combustion chamber from said outer partial combustion chamber.

9. The internal-combustion engine as defined in claim 1, wherein said inner partial combustion chamber has an outer surface of a material having a lesser heat conductivity than the heat conductivity of said piston.

10. The internal-combustion engine as defined in claim 1, further comprising a ceramic coating provided on said top piston face.

11. The internal-combustion engine as defined in claim 1, further comprising an insert mounted on said piston; said annular ridge, said inner partial combustion chamber and said outer partial combustion chamber being formed in said insert.

12. The internal-combustion engine as defined in claim 11, further comprising a well formed in the top face of said piston; and said insert being received in said well.

13. The internal-combustion engine as defined in claim 1, wherein said fuel injection device comprises a fuel injection valve for injecting fuel directly into said cylinder; further comprising control means regulating said fuel injection valve for determining a starting moment and a duration of injection of fuel as a function of load conditions of the engine to limit a formation of fuel/air mixture to said inner partial combustion chamber during partial-load conditions.

14. The internal-combustion engine as defined in claim 13, further comprising a suction intake pipe opening into said cylinder for introducing air thereinto; an additional fuel injection device having a fuel injection valve opening into said suction intake pipe; means for controlling a flow rate of air in said suction intake pipe; and additional control means for injecting additional fuel into said suction intake pipe from said fuel injection valve of said additional fuel injection device when a predetermined partial load condition of the engine is exceeded.

15. An internal-combustion engine as defined in claim 1, wherein said fuel injection device has a fuel injection valve opening into said cylinder for directly injecting fuel thereinto; and further comprising control means regulating said fuel injection valve for determining a starting moment and a duration of injection of fuel as a function of load conditions of the engine to limit a formation of fuel/air mixture to a partial region of said combustion chamber during partial-load conditions.

16. The internal-combustion engine as defined in claim 15, further comprising
   (a) a suction intake pipe opening into said cylinder for introducing air thereinto;
   (b) an additional fuel injection device having a fuel injection valve opening into said suction intake pipe;
   (c) means for controlling a flow rate of air in said suction intake pipe; and
   (d) additional control means for injecting additional fuel into said suction intake pipe from said fuel injection valve of said additional fuel injection device when a predetermined partial-load condition of the engine is exceeded.

\* \* \* \* \*